United States Patent Office 3,046,117

Patented July 24, 1962

3,046,117

LIGHT SENSITIVE MATERIAL FOR PRINTING AND PROCESS FOR MAKING PRINTING PLATES

Oskar Süs, Wiesbaden-Biebrich, Germany, assignor, by mesne assignments, to Azoplate Corporation, Murray Hill, N.J.

No Drawing. Filed Feb. 14, 1958, Ser. No. 715,221
Claims priority, application Germany Mar. 24, 1951
45 Claims. (Cl. 96—33)

The present invention relates to the photomechanical production of images and printing plates. More particularly it pertains to a process of making images and especially printing plates using light-sensitive material coated with a light-sensitive layer of orthoquinone diazides, a special group of diazo compounds.

In the U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1) or 1-diazo-naphthol-(2) and have the chemical constitution of esters or amides of a sulfo-acid or a carboxylic acid of these diazo naphthols are used to produce a light-sensitive layer on a base material; this layer is then exposed to actinic light under a master pattern, and the image is developed with alkali and subsequently heated.

In the above cited patent application Serial Number 174,556 it has also been pointed out that it is possible to add resins or fatty acids to the diazo compounds or to apply such resins or fatty acids to the base material as an intermediate layer between the base and the light-sensitive layer; the heating, furthermore, can be omitted and the process may also be carried out without the use of resins or fatty acids.

The U.S. patent applications Serial No. 202,403, filed December 22, 1950, and Serial No. 208,055, filed January 26, 1951, both by Maximilian Paul Schmidt; Serial No. 238,369, filed July 24, 1951, by Oskar Süs, and Serial No. 268,148, filed January 24, 1952, by Oskar Süs and Maximilian Paul Schmidt, all now abandoned, describe the use of other groups of diazo compounds that are insoluble in water and belong to the category of orthoquinone diazides.

All the inventions covered by the above-mentioned patent applications pertain to positive working processes or to the production of positives from positive master patterns or of negatives from negative master patterns.

The present invention pertains in addition to positive working processes wherein as stated above alkali is used as developing agent, to negative working processes by means of which negative printing plates can be obtained from positive master patterns and vice versa, positive printing plates can be obtained from negative master patterns by the use of specific water-insoluble diazo compounds of the category of basic ortho-quinone diazides hereunder described, if the light-sensitive material described, subsequent to the exposure of the diazo compound layer to actinic light is treated with a solvent for the diazo compound which may be an organic solvent, or with an acid. In certain cases it may be desirable to use a mixture containing both an acid and an organic solvent. It will be understood that the light sensitive material may be exposed to a projected light image as well as to a light image formed by contact exposure with a master pattern.

The "basic" ortho-quinone-diazide esters which are expressly suited for the development with acids (or acid agents) and for the manufacture of positive printing plates from negative masters have the formula:

$$R{-}SO_2{-}O{-}R_1{-}CH_2{-}N\begin{matrix}R_2\\ \\R_3\end{matrix}$$

in which R is a substituted or unsubstituted ortho-quinone diazide radical, $R_1$ is an arylene or heterocyclic radical, $R_2$ and $R_3$ are lower alkyl radicals, and N, $R_2$, and $R_3$ taken together form a piperidine ring.

When proceeding in accordance with this invention, the heating operation suggested as the last step of the process described in application Serial No. 174,556 can be omitted in most cases.

This invention is based on the fact that the behaviour of the water insoluble quinone-diazides when treated with one or the other chemical treating agent is different from the behaviour of their light-transformation products in particular with respect to the adhesion to the base material, especially, if metal foils or metal sheets are used as the base support. On exposure to actinic light the quinone-diazides are believed to turn into carboxylic acids of five-membered carbocycles; thus cyclo-pentadiene-carboxylic acids are obtained from the quinone-diazides of the benzene series, and indene-carboxylic acids originate from the quinone-diazides of the naphthalene series (compare O. Süs, "Liebig's Annalen der Chemie," volume 556, page 65 (1944). In addition to these acids which constitute readily coupling azo components azo dyes can possibly form at the places affected by light due to the coupling of undecomposed quinone-diazides with the carboxylic acids resulting from the action of light.

For removing the diazo compound which remained unchanged under the dense areas of the master in the course of the exposure to light, aqueous solutions of mineral acids such as phosphoric acid, sulfuric acid, hydrochloric acid or nitric acid or of organic acids, such as formic acid, acetic acid, oxalic acid, citric acid and the like, are very well suited. Acid salts such as sodium bisulfate may also be used. The solutions of these acids may be applied to the exposed material by any suitable means, e.g. with the aid of a cotton swab or the exposed material may be bathed or immersed therein. Thickening agents, like dextrin, gum arabic, water-soluble cellulose ethers or similar substances, can be added to the acid solution and the action of the acids may be tempered by the addition of buffer salts. Frequently, the addition of salts like sodium chloride, calcium chloride, ammonia chloride or magnesium sulfate will also prove of advantage. Water-soluble organic solvents, like lower aliphatic alcohols, e.g. methanol, ethanol, propanol, ethylene-chlorohydrine, glycol, glycol-mono-alkyl ethers, diglycol or triglycol, furthermore acetone, tetrahydrofuran, dioxane and the like, can also be added to the solution with advantage. The addition of salts frequently proves of advantage also when water miscible organic solvents are used.

When developing agents made up of water and water-miscible organic solvents (which may contain salts dissolved therein) are used, positive images are obtained from negative patterns and vice versa. The addition of acids is not absolutely necessary, however it proves of advantage.

The development can be effected also with water-immiscible organic solvents, like benzene, xylene, etc., or with dispersions of such solvents in water that may contain acids, thickening agents or salts. Mixtures of water-immiscible solvents with water-miscible solvents can also be employed. It is possible, furthermore, to use mixtures of several water-immiscible solvents. In this case it does not necessarily prove of disadvantage, the results, on the contrary, being decidedly favorable in some instances, if solvents are added that do not readily dissolve the diazo compounds in question, as is the case with most of the low aliphatic hydro-carbons, e.g. gasoline.

The preparation of the diazo compounds to be used for the production of the light-sensitive layer in accordance with this invention which constitutionally represent esterified sulfo acids of ortho-quinone diazides and which are insoluble in water while being soluble in organic solvents, can be performed by known methods. Insofar as the methods of preparation are not already known from the literature, they have been described in detail in the following examples.

For coating the base material, it is possible to use mixtures of two or more light-sensitive o-quinone diazides. In some instances an improvement of the layers can be achieved in this manner. This applies, in particular, to the o-quinone diazides that have a stronger tendency to crystallize. In these instances the use of mixtures of the diazo compounds results in uniform varnish-like layers that prove strongly resistant to abrasion when applied to the base material.

Metallic bases of the kind customarily used in planographic printing, for instance, aluminum or zinc or possibly brass, and furthermore lithographic stones, are primarily suited as base materials. The surfaces of these materials may be pretreated either mechanically by brushing, sandblasting or similar means, or chemically, e.g. by phosphate bath treatment or electrochemically in known and customary manner.

For coating the base material, the diazo compounds to be used according to this invention are dissolved in an oragnic solvent, e.g. alcohol, dioxane, glycol ether, etc., or in a mixture of several solvents and are applied to the base by brushing, whirlcoating, spraying, immersion, roller application or any other method and are then dried.

For the purpose of facilitating the control of the exposure, dyes can be added to the sensitizing solutions which bleach out under the influence of light or compounds that get colored when exposed to light may be added, e.g. small quantities of diazo-salicylic acid which yields a red dye when exposed to light. The developed image is rendered more visible to the eye if dyes are added to the coating solutions, e.g. a small quantity of eosin (Schultz, "Farbstofftabellen," 7th edition, volume 1, page 375, No. 883). The same effect can be achieved by the use of o-quinone diazides derived from dyes, for example, o-quinone diazides which are also azo dyes; i.e. they have at least one auxochromic group in the part of the molecule connected to the sulfo acid group by esterification or amidation.

The light-sensitive layers obtained with water-insoluble o-quinone diazides in accordance with this invention can be stored for a considerable period of time in unexposed condition, and thus presensitized light-sensitive foils ready for use can be made available by the invention.

The following compounds which are referred to in the following examples represent ortho quinone diazides which are useful according to the present invention. The parts stated in the examples are parts by weight, if not otherwise indicated. The examples illustrate the method of developing light sensitive layers containing ortho-quinone-diazide-sulfonic acid esters of the present invention having basic properties with acid agents such as acids and acid salts and where the developing medium may contain a certain quantity of an organic solvent.

Formula 1:

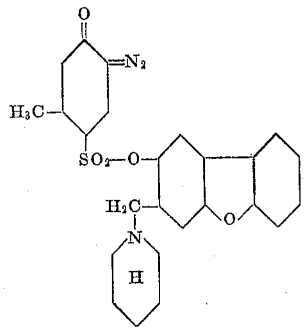

Formula 2:

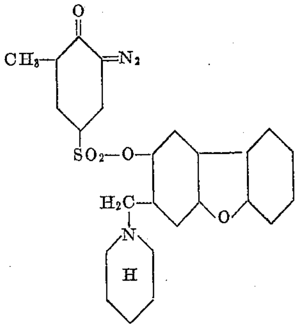

Formula 3:

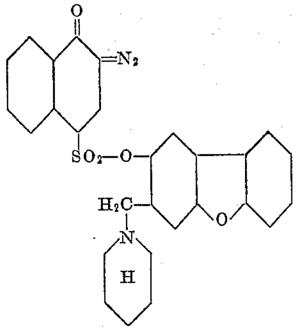

Formula 4:

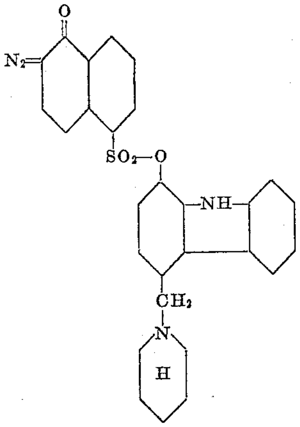

Formula 5:

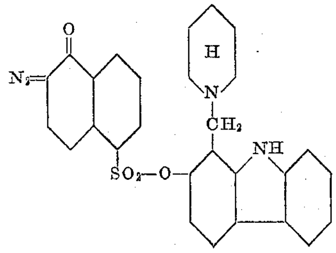

Formula 6:
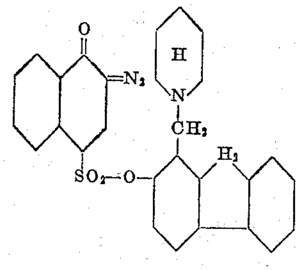
Formula 7:
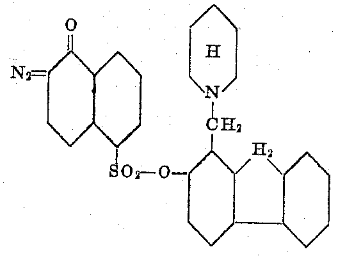
Formula 8:
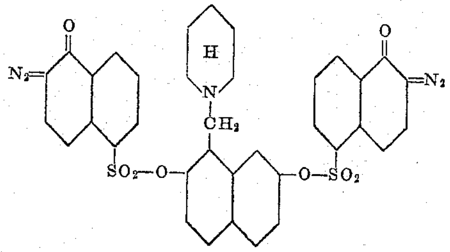
Formula 9:
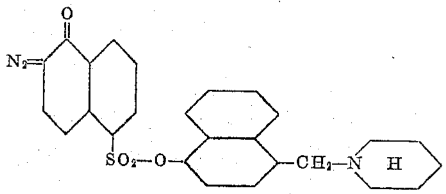
Formula 10:
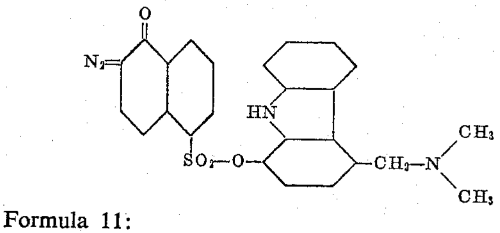
Formula 11:
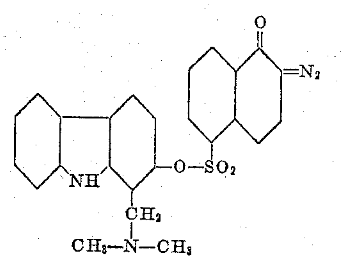
Formula 12:
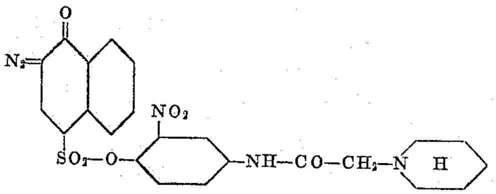
Formula 13:
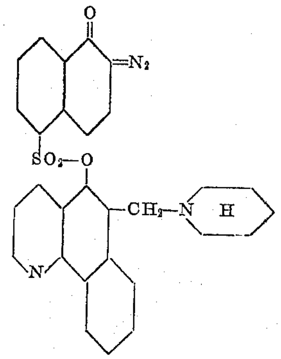
Formula 14:
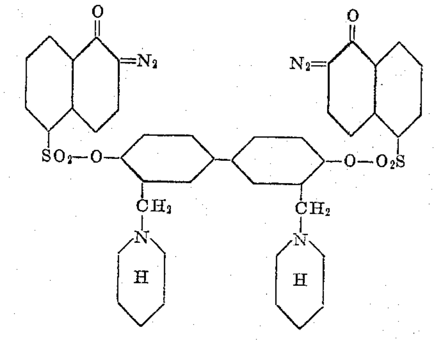
Formula 15:
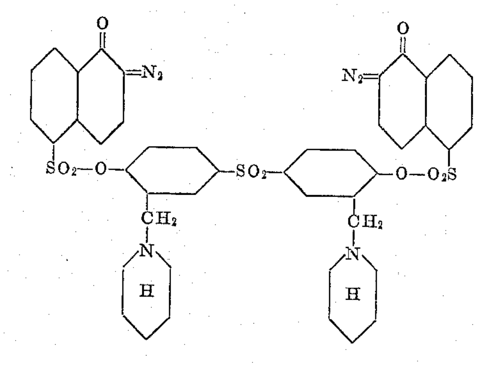
Formula 16:
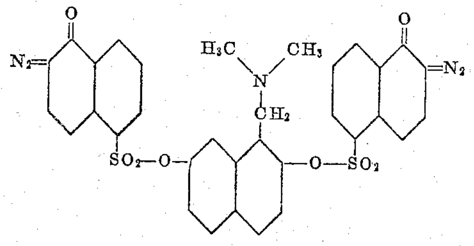
Formula 17:
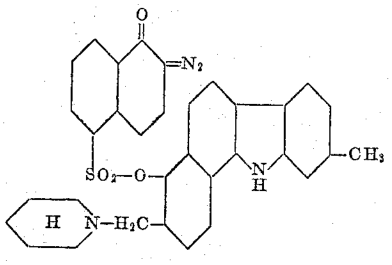

Formula 18:

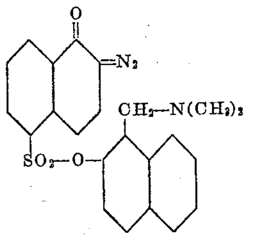

Formula 19:

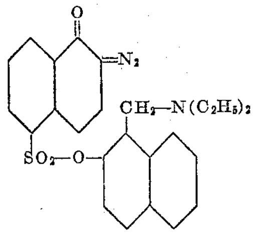

Formula 20:

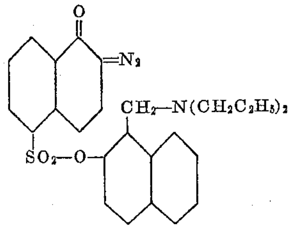

The following examples are inserted merely for the purpose of illustrating the above described process without any intention of restricting the scope of the invention.

*Examples*

(1) A 2% solution of the ester of benzoquinone-(1,2)-diazide-(2)-5-methyl-4-sulfo acid and 3-hydroxy-2-piperidylmethyl-diphenyleneoxide (the ester conforms to the Formula 1) is applied to a superficially roughened aluminum plate by one of the methods customarily used in graphic work, e.g. by whirlcoating and the light-sensitive layer is thoroughly dried by means of an air current with a temperature of approximately 60° C. Subsequent to the exposure to light of the sensitized foil under a transparent pattern, there is obtained from a positive pattern a faintly red-colored negative image on a yellow background. The image is developed by wiping over with a cotton swab soaked with a 5% solution of phosphoric acid. After the plate has been rinsed with water and inked with greasy ink, the negative image shows distinctly on a clean metallic background.

The above mentioned diazo compound is produced in the following manner:

5.6 g. of 2-piperidylmethyl-3-hydroxy-diphenyleneoxide obtained by the reaction of 3-hydroxydiphenyleneoxide with formaldehyde and piperidine (fusing point 114° to 115° C.) are dissolved in 20 cc. of dioxane and a solution of 5 g. of 5-methyl-benzoquinone-(1,2)-diazide-(2)-4-sulfochloride (derived from 5-methyl-benzoquinone-(1,2)-diazide-(2)-4-sulfo acid and chlorosulfonic acid; melting point 111° C. under decomposition) in 50 cc. of dioxane is added thereto. 50 cc. of a 5% solution of soda are slowly introduced while stirring into this mixture and stirring of the mixture is continued for several hours. Then into the reaction mixture there are introduced approximately 350 cc. of water and 100 cc. of a 16% solution of hydrochloric acid, and the resulting yellowish-brown solution in nuchared from some flakes. Most of the hydrochloric acid contained in the filtrate is neutralized with the aid of a solution of caustic soda and by completing the neutralization of the acid by means of a solution of sodium bicarbonate there is obtained the 5-methyl-benzoquinone-(1,2)-diazide-(2)-4-sulfo acid of 2-piperidylmethyl-3-hydroxy-diphenyleneoxide in the form of a fine-grained yellow precipitate. The diazo compound decomposes at a temperature of about 190° C. after previously darkening.

Equally favorable results can be achieved in producing the light sensitive layer by using in the place of the diazo compound conforming to the Formula 1, one of the diazo compounds conforming to the Formulae 2 and 3 in the form of a 1% solution in glycol monomethyl ether.

Said diazo compounds (Formulae 2 and 3) can be prepared in the following manner:

The above mentioned 2-piperidylmethyl-3-hydroxy-diphenylene-oxide is caused to react with an equimolecular quantity of 6-methyl-benzoquinone-(1,2)-diazide-(2)-4-sulfochloride produced from 6-methyl-benzoquinone-(1,2)-diazide-(2)-4-sulfo acid by the action of chloro-sulfonic acid with the addition of pyridine. There is obtained the 6-methyl-benzoquinone-(1,2)-diazide-(2)-4-sulfoacid ester of 2-piperidylmethyl-3-hydroxy-diphenylene oxide conforming to the Formula 2. On heating this diazo compound in a capillary tube for the purpose of ascertaining its melting point darkening of the diazo compound begins at a temperature of approximately 100° C. The compound gradually chars when heated to a higher temperature.

The ester conforming to the Formula 3 is prepared analogously from naphthoquinone-(1,2)-diazide-(2)-4-sulfoacid and 2-piperidylmethyl-3-hydroxy-diphenylene-oxide. The condensation of naphthoquinone-(1,2)-diazide)-(2)-4-sulfochloride with the hydroxy compound is effected in the presence of soda which serves as acid-binding agent. The diazo compound thus obtained decomposes at approximately 185° C. after previous darkening.

(2) Following the procedure indicated in Example 1 an aluminum foil is coated with a 1% solution of a diazo compound conforming either to the Formula 4 or to the Formula 5 in glycol monomethyl ether and an image is produced on the sensitized, thoroughly dried foil by its exposure to an arc lamp under a master. The exposed foil is developed by wiping it over with a cotton swab soaked with a 3–5% solution of phosphoric acid and is then inked subsequent to the plate being rinsed with water. A positive image is obtained from a negative master.

In order to prepare the diazo compound conforming to the Formula 4, equimolecular quantities of naphthoquinone-(1,2)-diazide-(2)-5-sulfochloride and of 4-piperidylmethyl-1-hydroxy-carbazole, melting point 177°–179° C., produced from 1-hydroxy-carbazole by reaction with an equimolecular quantity of a mixture of formaldehyde and piperidine dissolved in dioxane are brought to reaction in the presence of soda. The naphthoquinone-(1,2)-diazide-(2)-5-sulfo acid ester of 4-piperidylmethyl-1-hydroxy-carbazole decomposes at a temperature of approximately 105° C.

By causing naphthoquinone-(1,2)-diazide-(2)-5-sulfochloride to react with 1-piperidylmethyl-2-hydroxy-carbazole, melting point 204° C., produced from 2-hydroxy-carbazole by reaction with equimolecular quantities of formaldehyde and piperidine there is obtained the naphthoquinone-(1,2)-diazide-(2)-5-sulfo acid ester of 1-piperidylmethyl-2-hydroxy-carbazole conforming to the Formula 5. This diazo compound decomposes at a temperature of approximately 120° C. after previously taking on a red color.

(3) An aluminum foil is rendered light sensitive in the customary manner with a 1% solution of the diazo compound conforming to the Formula 6 in glycol monomethyl ether. By exposing the coated foil to light behind a negative master an image is produced which is then developed by being wiped over with a 1% solution of phosphoric acid. The developed plate can be put into one of the customary planographic-printing presses and be used in reproduction work. Positive copies are obtained from negative patterns.

Equally good results can be obtained by using the diazo compound conforming to the Formula 7 in the place of the above mentioned diazo compound.

In order to prepare the diazo compound conforming to the Formula 6, equimolecular quantities of naphthoquinone-(1,2)-diazide-(2)-4-sulfochloride and of 1-piperidylmethyl-2-hydroxy-fluorene, melting point 169°–170° C., produced from 2-hydroxy-fluorene, formaldehyde and piperidine, are brought to reaction analogously to the method indicated in the previous examples. The naphthoquinone (1,2)-diazide-(2)-4-sulfo acid ester of 1-piperidylmethyl-2-hydroxy-fluorene chars when heated in a capillary tube at a temperature of 125° C.

The diazo compound conforming to the Formula 7 is prepared analogously by the condensation of naphthoquinone-(1,2)-diazide-(2)-5-sulfochloride with 1-piperidylmethyl-2-hydroxy-fluorene. When heated in a capillary tube this diazo compound darkens more and more at temperatures above 120° C. and decomposes slowly.

(4) A 1% solution of the diazo compound conforming to the Formula 8 in dimethylformamide is applied by brushing to a superficially roughened aluminum foil. On the dried sensitized foil there is produced by exposure under a master as indicated in Example 2 an image which is developed by wiping with a solution consisting of 5 parts of ethyl alcohol. A positive image is obtained from a negative master.

The diazo compound conforming to the Formula 8 is prepared by the condensation of 1 mol of 1-piperidylmethyl-2,7-dihydroxy-naphthalene, melting point 147–148° C., produced from 2,7-dihydroxy-naphthalene by reaction with 1 mole each of formaldehyde and piperidine with 2.2 moles of naphthoquinone-(1,2)-diazide-(2)-5-sulfochloride in dioxane with the addition of soda solution. The di-[naphthoquinone-(1,2)-diazide-(2)-5-sulfo-acid]-ester of 1-piperidylmethyl-2,7-dihydroxy-naphthalene slowly darkens when heated to more than 140° C. in a capillary tube and gradually chars at higher temperatures.

(5) In accordance with the procedure indicated in Example 4, an aluminum foil is coated with a 1% solution of the diazo compound conforming to the Formula 9 and the sensitized material is used to produce an image. The development of the image is effected with a 1% solution of phosphoric acid. From a negative pattern there is obtained a positive image that takes greasy ink and can be used as a printing plate.

The diazo compound conforming to Formula 9 is prepared in the following manner:

Equimolecular quantities of naphthoquinone-(1,2)-diazide-(2)-5-sulfochloride and of 4-piperidylmethyl-1-hydroxy-naphthalene, melting point 130°–134° C., produced from 1-hydroxy-naphthalene by reaction with equimolecular quantities of formaldehyde and piperidine are caused to react in the presence of soda in the manner described in the previous example. The naphthoquinone-(1,2)-diazide-(2)-5-sulfo-acid ester of 4-piperidylmethyl-1-hydroxy-naphthalene which cannot be recrystallized decomposes at a temperature of approximately 110° C. after previous sintering.

(6) An aluminum plate coated with a 1% solution of the diazo compound conforming to the Formula 10 in dioxane is exposed to light under a transparent master and the image thus produced is developed with a 1% solution of phosphoric acid. The resulting image which is negative with respect to the master can be inked with greasy ink and is then ready for printing.

When the diazo compound conforming to the Formula 11 is used instead of the diazo compound conforming to the Formula 10 the development of the exposed foil requires a solution containing 3–10% of phosphoric acid.

In order to prepare the diazo compound conforming to the Formula 10, equimolecular quantities of naphthoquinone-(1,2)-diazide-(2)-5-sulfochloride and of 4-dimethyl-aminomethyl-1-hydroxy-carbazole, melting point 158° C. under decomposition, produced from 1-hydroxy-carbazole and equimolecular quantities of formaldehyde and dimethylamine in alcoholic solution are brought to reaction in the presence of soda. The naphthoquinone-(1,2)-diazide -(2)-5-sulfo-acid ester of 4-dimethyl-amino-methyl-1-hydroxy-carbazole when heated in a capillary tube decomposes slowly above 150° C., while taking on a brown color.

The naphthoquinone-(1,2)-diazide - (2) - 5 - sulfo acid ester of 1-dimethyl-aminomethyl - 2 - hydroxy - carbazole conforming to the Formula 11 is prepared analogously. When heated in a capillary tube for the purpose of ascertaining its melting point the ester thus obtained begins to decompose slowly at a temperature of 140° C. while taking on a brown color.

(7) An aluminum foil is coated in the customary manner with a 1% solution of the diazo compound corresponding with Formula 12 in glycol monomethyl ether. The development of the image formed by exposing the sensitized foil to actinic light-rays behind a master is performed with the aid of phosphoric acid of 0.5% strength. On rubbing in the developed coated side of the foil with greasy ink the image becomes visible showing a good contrast on the metallic background. The image is negative, if a positive master has been used, and positive, if a negative master has been used.

The diazo compound corresponding with Formula 12 is prepared by condensing naphthoquinone-(1,2)-diazide-(2)-4-sulfochloride with 1-hydroxy-2-nitro-4-piperidyl-acetyl-amino-benzene. This last named compound may be produced from 1-hydroxy - 2 - nitro - 4 - aminobenzene which is first reacted upon with chloroacetylchloride in a chlorobenzene medium and the resulting 1-hydroxy-2-nitro-4-chloroacetylaminobenzene (melting point 136–137° C.) is then heated with piperidine on the water bath. The diazo compound with the Formula 12 when heated in a capillary tube sinters at 90° C. and decomposes at 120° C.

(8) A 1% solution of the diazo compound corresponding to Formula 13 in ethylene glycol monomethyl ether is coated onto an aluminum foil both sides of which have been mechanically roughened, and the foil is then dried with warm air. Subsequently, the coated foil is after-dried for 5 minutes at 90° C. The foil thus light-sensitized is then exposed under a transparent negative original and developed with a 0.1% solution of phosphoric acid. After development, the image is rinsed with water and then inked with greasy ink. Thus from a negative original a positive printing plate is obtained.

The diazo compound corresponding to Formula 13 is prepared by condensing equimolecular quantities of 2-diazo-naphthol - (1) - 5 - sulfochloride with 6-piperidyl-methyl-5-hydroxy - 7:8 - benzoquinoline. The last mentioned compound is prepared by dissolving 5-hydroxy-7:8-benzoquinoline in dioxane and reacting the solution with equimolecular quantities of formaldehyde and piperidine in the presence of sodium carbonate; melting point 111–112° C. The ester of 2-diazo-naphthol-(1)-5-sulfonic acid and 6-piperidylmethyl-5-hydroxy-7:8-benzoquinoline is a greenish-yellow compound which decomposes at 135–138° C.

(9) A 1% solution of the diazo compound corresponding to Formula 14 in ethylene glycol monomethyl ether is coated onto an aluminum foil both sides of which have been mechanically roughened, and the foil is dried first with warm air and then for 5 minutes at 90° C. The light sensitive layer thus produced is exposed under a negative transparent original and then developed by means of a 1–2% solution of phosphoric acid. It may subsequently be inked with greasy ink. From a negative original a positive printing plate is obtained.

The diazo compound corresponding to Formula 14 is obtained by condensation of 1 mol of 3:3′-dipiperidylmethyl-4:4'-dihydroxy-diphenyl (obtained from 1 mol of 4:4'-dihydroxy-diphenyl and 2 mols of formaldehyde and piperidine in an ethanolic solution; melting point 155–156° C.) with 2.2 mols of 2-diazo-naphthol-(1)-5-sulfochloride in dioxane in the presence of sodium carbonate solution. The bis-2-diazo-naphthol-(1)-5-sulfonic acid ester of 3:3'-dipiperidylmethyl-4:4'-dihydroxy-diphenyl thus formed is obtained as a yellow substance which decomposes when heated to temperatures over 105° C.

(10) A 1% solution of the diazo compound corresponding to Formula 15 in ethylene glycol monomethyl ether is coated onto an aluminum foil both sides of which have been mechanically roughened and dried. The light sensitive layer thus produced on the foil is exposed under a negative transparent original and then developed with a 20% solution of phosphoric acid. The printing plate thus obtained—a positive printing plate from a negative original—may immediately be inked with greasy ink.

The diazo compound corresponding to Formula 15 is obtained by condensation of 1 mol of 3:3'-dipiperidylmethyl-4:4'-dihydroxy-diphenylsulfone (prepared from 1 mol of 4:4'-dihydroxy-diphenyl-sulfone with 2 mols of formaldehyde and piperidine in an ethanolic solution; the compound melts at 130° C. with decomposition) and 2.2 mols of 2-diazo-naphthol-(1)-5-sulfochloride in dioxane in the presence of sodium carbonate solution. The bis-2-diazo-naphthol-(1)-5-sulfonic acid ester of 3:3'-dipiperidylmethyl-4:4'-dihydroxy-diphenyl-sulfone thus obtained is a greenish-yellow substance which decomposes at 95° C.

(11) A 1% solution of the diazo compound corresponding to Formula 16 in ethylene glycol monomethyl ether is coated onto an aluminum foil both sides of which have been mechanically roughened. The coated foil is then dried first with warm air and then for 5 minutes at 90° C. After exposing the light sensitive layer under a negative transparent original the image which has formed is developed with a 10% solution of phosphoric acid. It may immediately be inked with greasy ink. Thus a positive printing plate is obtained from a negative original.

The diazo compound corresponding to Formula 16 is obtained by condensation of 1 mol of 1-dimethylaminomethyl-2:7-dihydroxy-naphthalene (prepared from 2:7-dihydroxy-naphthalene and 1 mol of formaldehyde and dimethylamine in an ethanolic solution; melting point 158° C.) and 2.2 mols of 2-diazo-naphthol-(1)-5-sulfochloride in dioxane in the presence of sodium carbonate. The bis-2-diazo-naphthol-(1)-5-sulfonic acid ester of 1-dimethylaminomethyl-2:7-dihydroxy-naphthalene thus obtained is a yellowish-green substance which upon heating in a tube in a pre-heated block decomposes at 133–134° C.

(12) A 1% solution of the diazo compound corresponding to Formula 17 in ethylene glycol monomethyl ether is coated onto an aluminum foil having both sides roughened mechanically. After coating the foil is dried first in a current of hot air and subsequently for 5 minutes in a drier at a temperature of 90° C. The coated aluminum foil is then exposed to light action under a negative transparent master and the image formed by such exposure in the light sensitive layer is developed by means of a cotton swab soaked with a mixture in the form of an emulsion composed of 750 parts by volume of a 5% aqueous phosphoric acid and 250 parts by volume of tetrahydro-naphthalene (tetralene), the emulsion containing also 20% of gum arabic. The developed aluminum foil is rinsed with water and then inked with greasy ink. Thus a positive printing plate is obtained from the negative master.

The diazo compound corresponding to Formula 17 is prepared as follows:

Equimolecular quantities of naphthoquinone-(1,2)-diazide-(2)-5-sulfochloride and of 4'-piperidinomethyl-3'-hydroxy-1',2'-benzo-7-methyl-1,2-carbazole are condensed in dioxane in the presence of sodium carbonate. The ester formed by said condensation corresponds to Formula 17. It is a yellow body melting in the neighborhood of 180° C. under decomposition.

(13) A 1% solution of the diazo compound corresponding to Formula 18 in ethylene glycol monomethyl ether is coated onto an aluminum foil having both sides roughened mechanically. After coating the foil is dried first in a current of hot air and subsequently for 5 minutes in a drier at a temperature of 90° C. The coated aluminum foil is then exposed to light action under a negative transparent master and the image formed by such exposure in the light sensitive layer is developed by means of a cotton swab soaked with a 0.5% aqueous phosphoric acid. The developed aluminum foil is rinsed with water and then inked with greasy ink. Thus a positive printing plate is obtained from the negative master. In this case the rinsing operation with water may be dispensed with and the foil after development with dilute phosphoric acid may be inked without further treatment.

Equally favorable results can be achieved in producing the light sensitive layer by using in the place of the diazo compound conforming to the Formula 18 one of the diazo compounds conforming to the Formulae 19 and 20 in the form of a 1% solution in ethylene glycol monmethyl ether. When the diazo compound conforming to the Formula 19 is used instead of the diazo compound of Formula 18 the development of the exposed aluminum foil requires a 5% aqueous solution of monosodium phosphate. When the diazo compound conforming to the Formula 20 is used instead of the diazo compound conforming to the Formula 18, the development of the exposed foil requires a 1% aqueous phosphoric acid.

The diazo compound corresponding to Formula 18 is prepared by condensation of equimolecular quantities of naphthoquinone-(1,2)-diazide-(2)-5-sulfochloride and of 1-dimethyl-aminomethyl-2-hydroxy-naphthalene in dioxane in the presence of sodium carbonate. The ester which is formed by this condensation process corresponds to Formula 18. The compound is a yellow-colored body which begins to sinter at 110° C. and decomposes at a temperature of 150° C. 1-dimethylaminomethyl-2-hydroxy-naphthalene is prepared by dissolving β-naphthol in ethyl alcohol and adding equimolecular quantities of formaldehyde and dimethylamine to this solution. The compound melts at 75° C.

The diazo compound corresponding to Formula 19 is prepared by condensation of equimolecular quantities of naphthoquinone-(1,2)-diazide-(2)-5-sulfochloride with 1-diethylaminomethyl-2-hydroxy-naphthalene in dioxane in the presence of sodium carbonate. The ester which is formed by this condensation process corresponds to Formula 19. The compound is yellow-colored and decomposes when heated to a temperature of 140° C. 1-diethylaminomethyl-2-hydroxy-naphthalene is prepared by dissolving β-naphthol in ethyl alcohol and adding equimolecular quantities of formaldehyde and diethylamine to this solution. The compound thus formed is an oily product.

The diazo compound corresponding to Formula 20 is prepared by condensation of equimolecular quantities of naphthoquinone-(1,2)-diazide-(2)-5-sulfochloride with 1-dipropylaminomethyl-2-hydroxy-naphthalene in dioxane in the presence of sodium carbonate. The ester which is formed by this condensation process corresponds to Formula 20. It is a yellow-colored compound which decomposes when heated to a temperature of 145° C. 1 - dipropylaminomethyl - 2 - hydroxy-naphthalene is prepared by dissolving β-naphthol in ethyl alcohol and adding equimolecular quantities of formaldehyde and dipropylamine to this solution. The compound thus formed is an oily product.

This application is a continuation-in-part of application Serial No. 472,224, filed November 30, 1954, which, in turn, is a continuation-in-part of application Serial No. 277,714, filed March 20, 1952, and now abandoned.

What is claimed is:

1. A compound having the formula

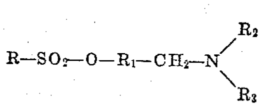

in which R is an ortho-quinone diazide group, $R_1$ is an arylene group, and $R_2$ and $R_3$ are selected from the group consisting of lower alkyl groups and groups which taken together with N form a piperidine ring.

2. A compound having the formula

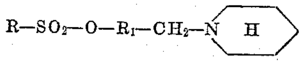

in which R is an ortho quinone diazide group, and $R_1$ is an arylene group.

3. A compound having the formula $$R{-}SO_2{-}O{-}R_1{-}CH_2{-}N(CH_3)_2$$

in which R is an ortho quinone diazide group and $R_1$ is an arylene group.

4. A compound having the formula

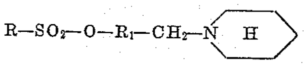

in which R is an ortho naphthoquinone diazide group and $R_1$ is an arylene group.

5. A compound having the formula $$R{-}SO_2{-}O{-}R_1{-}CH_2{-}N(CH_3)_2$$

in which R is an ortho naphthoquinone diazide group and $R_1$ is an arylene group.

6. A compound having the formula

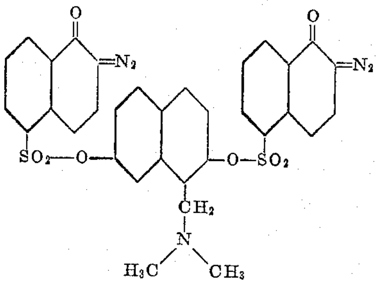

7. A compound having the formula

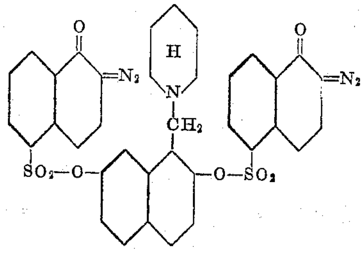

8. A compound having the formula

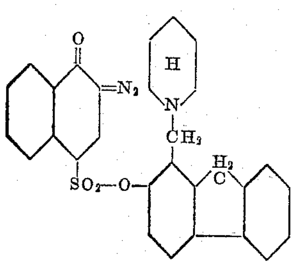

9. A compound having the formula

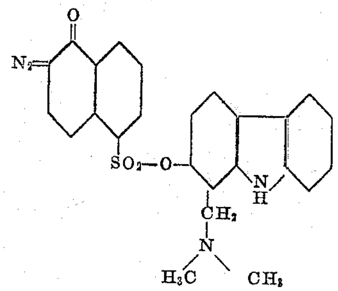

10. A compound having the formula

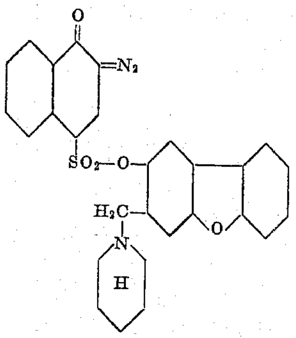

11. A presensitized printing plate comprising a base material having a coating thereon comprising a compound having the formula

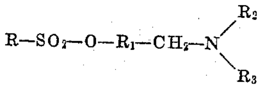

in which R is an ortho-quinone diazide group, $R_1$ is an arylene group, and $R_2$ and $R_3$ are selected from the group consisting of lower alkyl groups and groups which taken together with N form a piperidine ring.

12. A presensitized printing plate comprising a base material having a coating thereon comprising a compound having the formula

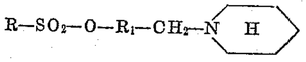

in which R is an ortho quinone diazide group, and $R_1$ is an arylene group.

13. A presensitized printing plate comprising a base material having a coating thereon comprising a compound having the formula $$R{-}SO_2{-}O{-}R_1{-}CH_2{-}N(CH_3)_2$$

in which R is an ortho quinone diazide group and $R_1$ is an arylene group.

14. A presensitized printing plate comprising a base material having a coating thereon comprising a compound having the formula

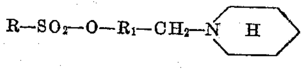

in which R is an ortho naphthoquinone diazide group and $R_1$ is an arylene group.

15. A presensitized printing plate comprising a base material having a coating thereon comprising a compound having the formula $$R{-}SO_2{-}O{-}R_1{-}CH_2{-}N(CH_3)_2$$

in which R is an ortho naphthoquinone diazide group and $R_1$ is an arylene group.

16. A presensitized printing plate comprising a base material having a coating thereon comprising a compound having the formula

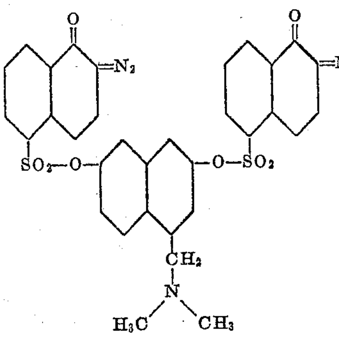

17. A presensitized printing plate comprising a base material having a coating thereon comprising a compound having the formula

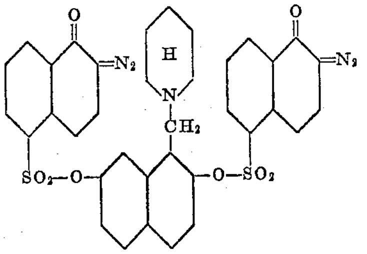

18. A presensitized printing plate comprising a base material having a coating thereon comprising a compound having the formula

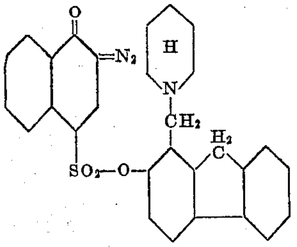

19. A presensitized printing plate comprising a base material having a coating thereon comprising a compound having the formula

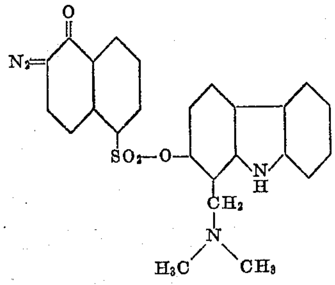

20. A presensitized printing plate comprising a base material having a coating thereon comprising a compound having the formula

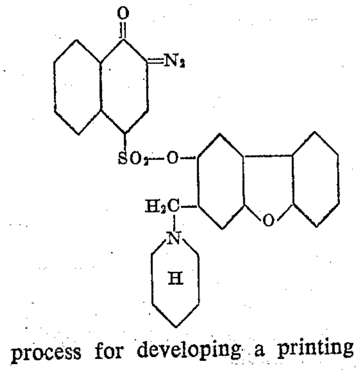

21. A process for developing a printing plate which comprises exposing to light under a master a plate having a compound thereon of the formula

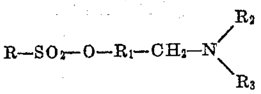

in which R is an ortho-quinone diazide group, $R_1$ is an arylene group, and $R_2$ and $R_3$ are selected from the group consisting of lower alkyl groups and groups which taken together with N form a piperidine ring to thereby form a decomposition product in the light struck areas and removing the decomposition product by treatment with a weakly alkaline solution.

22. A process for developing a printing plate which comprises exposing to light under a master a plate having a compound thereon of the formula

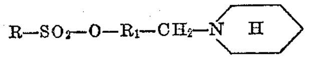

in which R is an ortho quinone diazide group, and $R_1$ is an arylene group; to thereby form a decomposition product in the light struck areas and removing the decomposition product by treatment with a weakly alkaline solution.

23. A process for developing a printing plate which comprises exposing to light under a master a plate having a compound thereon of the formula $$R—SO_2—O—R_1—CH_2—N(CH_3)_2$$

in which R is an ortho quinone diazide group and $R_1$ is an arylene group; to thereby form a decomposition product in the light struck areas and removing the decomposition product by treatment with a weakly alkaline solution.

24. A process for developing a printing plate which comprises exposing to light under a master a plate having a compound thereon of the formula

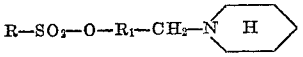

in which R is an ortho naphthoquinone diazide group and $R_1$ is an arylene group; to thereby form a decomposition product in the light struck areas and removing the decomposition product by treatment with a weakly alkaline solution.

25. A process for developing a printing plate which comprises exposing to light under a master a plate having a compound thereon of the formula $$R—SO_2—O—R_1—CH_2—N(CH_3)_2$$

in which R is an ortho naphthoquinone diazide group and $R_1$ is an arylene group; to thereby form a decomposition product in the light struck areas and removing the decomposition product by treatment with a weakly alkaline solution.

26. A process for developing a printing plate which comprises exposing light under a master plate having a compound thereon of the formula

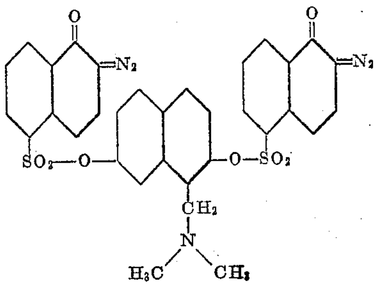

to thereby form a decomposition product in the light struck areas and removing the decomposition product by treatment with a weakly alkaline solution.

27. A process for developing a printing plate which comprises exposing to light under a master a plate having a compound thereon of the formula

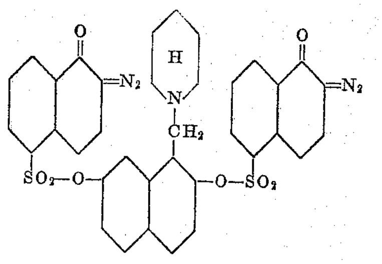

to thereby form a decomposition product in the light struck areas and removing the decomposition product by treatment with a weakly alkaline solution.

28. A process for developing a printing plate which comprises exposing to light under a master a plate having a compound thereon of the formula

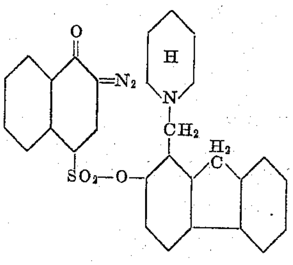

to thereby form a decomposition product in the light struck areas and removing the decomposition product by treatment with a weakly alkaline solution.

29. A process for developing a printing plate which comprises exposing to light under a master a plate having a compound thereon of the formula

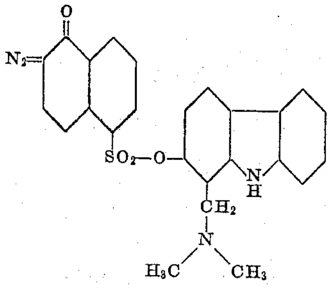

to thereby form a decomposition product in the light struck areas and removing the decomposition product by treatment with a weakly alkaline solution.

30. A process for developing a printing plate which comprises exposing to light under a master a plate having a compound thereon of the formula

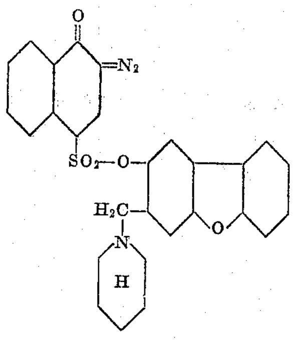

to thereby form a decomposition product in the light struck areas and removing the decomposition product by treatment with a weakly alkaline solution.

31. A compound having the formula

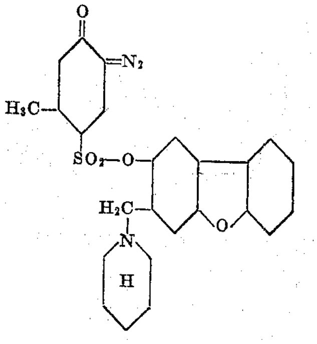

32. A compound having the formula

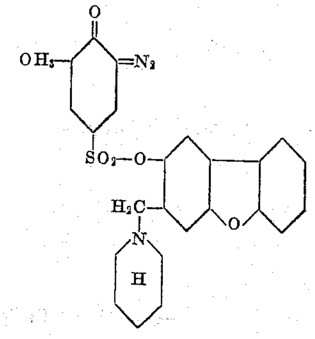

33. A compound having the formula

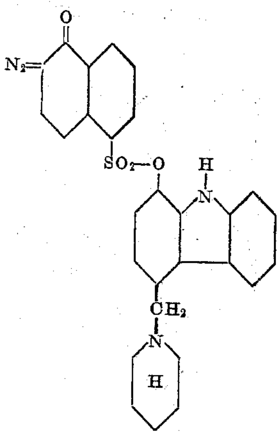

34. A compound having the formula

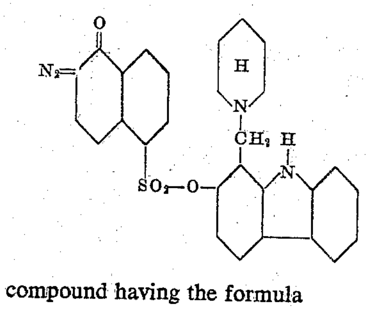

35. A compound having the formula

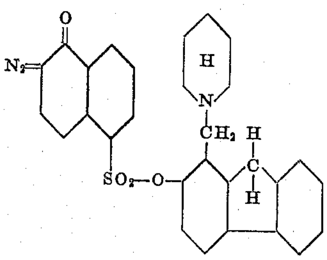

36. A compound having the formula

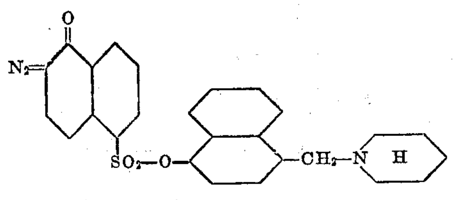

37. A compound having the formula

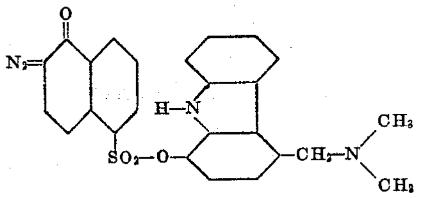

38. A compound having the formula

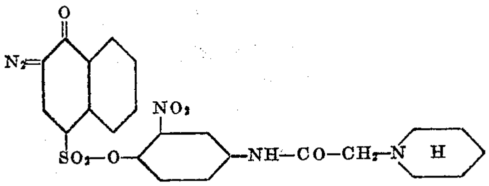

39. A compound having the formula

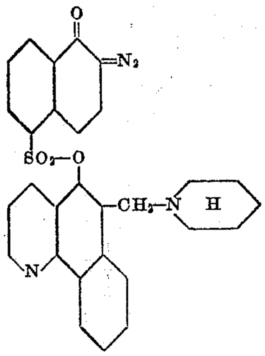

40. A compound having the formula

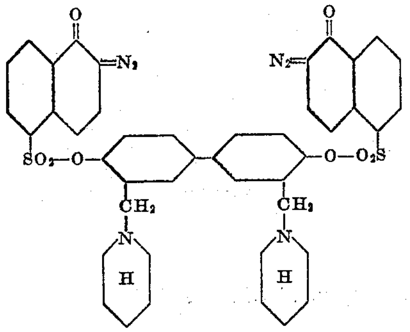

41. A compound having the formula

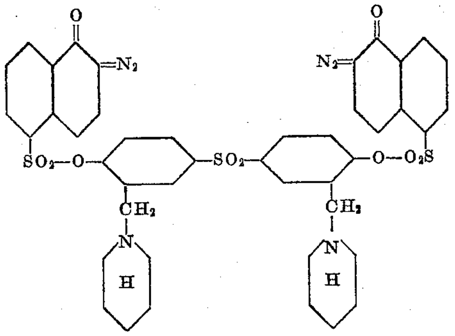

42. A compound having the formula

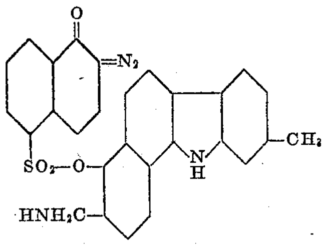

43. A compound having the formula

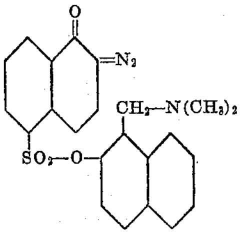

44. A compound having the formula

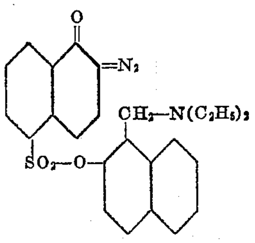

45. A compound having the formula

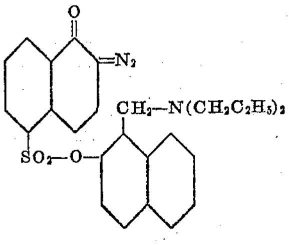

References Cited in the file of this patent

FOREIGN PATENTS 930,608 Germany ---------------- July 21, 1955